(12) United States Patent
Flack et al.

(10) Patent No.: US 9,418,353 B2
(45) Date of Patent: Aug. 16, 2016

(54) METHODS AND SYSTEMS FOR DELIVERING CONTENT TO DIFFERENTIATED CLIENT DEVICES

(75) Inventors: Martin T. Flack, Boston, MA (US); Eric L. Kobrin, Cambridge, MA (US); Stephen L. Ludin, Mill Valley, CA (US); David H. Kaufman, Lexington, MA (US)

(73) Assignee: AKAMAI TECHNOLOGIES, INC., Cambridge, MA (US)

( * ) Notice: Subject to any disclaimer, the term of this patent is extended or adjusted under 35 U.S.C. 154(b) by 187 days.

(21) Appl. No.: 13/330,935

(22) Filed: Dec. 20, 2011

(65) Prior Publication Data

US 2012/0203861 A1 Aug. 9, 2012

Related U.S. Application Data

(60) Provisional application No. 61/424,940, filed on Dec. 20, 2010.

(51) Int. Cl.
*G06F 15/16* (2006.01)
*G06Q 10/10* (2012.01)
(Continued)

(52) U.S. Cl.
CPC ............... *G06Q 10/10* (2013.01); *H04W 4/18* (2013.01); *H04L 67/04* (2013.01); *H04L 67/2823* (2013.01)

(58) Field of Classification Search
CPC ... H04L 67/04; H04L 51/063; H04L 67/2823; G06F 17/30905; H04W 4/18; G06Q 10/10
USPC .......................... 709/217, 246, 250; 455/414.3
See application file for complete search history.

(56) References Cited

U.S. PATENT DOCUMENTS

| | | | | |
|---|---|---|---|---|
| 5,818,446 A | * | 10/1998 | Bertram et al. | ................ 715/746 |
| 5,918,013 A | * | 6/1999 | Mighdoll | .................. G06F 8/65 |
| | | | | 348/E5.105 |
| 6,023,714 A | * | 2/2000 | Hill | ........................ G06F 17/211 |
| | | | | 715/235 |

(Continued)

FOREIGN PATENT DOCUMENTS

EP 0949571 A2 7/1999

OTHER PUBLICATIONS

U.S. Appl. No. 13/330,935, Michael A. Chamber.*

(Continued)

*Primary Examiner* — Viet Vu
*Assistant Examiner* — Michael A Chambers

(57) ABSTRACT

Methods and systems are disclosed for delivery of tailored content to differentiated devices, such as desktop, mobile, and tablet devices, over a computer network. In one embodiment, a proxy cache server has a content cache for storing previously retrieved objects like web pages or multimedia files. For at least some objects, several versions are stored, each version representing an object suited for a given set of client device characteristics. A device-equivalency data structure maintained at the proxy facilitates a determination of whether such cached versions can be used to service a current request. The versions might represent, for example, modified versions created using, e.g., mobile device transcoding techniques, in response to prior requests. They may also represent a set of alternate content created by a content provider and available from an origin server. Such methods and systems may be implemented in a distributed computing networks, e.g., a content delivery network.

21 Claims, 7 Drawing Sheets

(51) Int. Cl.
*H04W 4/18* (2009.01)
*H04L 29/08* (2006.01)

(56) References Cited

U.S. PATENT DOCUMENTS

| | | | | |
|---|---|---|---|---|
| 6,029,175 A * | 2/2000 | Chow | | G06F 17/30899 |
| 6,167,441 A * | 12/2000 | Himmel | | G06F 17/30905 |
| | | | | 707/999.104 |
| 6,173,311 B1 * | 1/2001 | Hassett | | G06F 17/30067 |
| | | | | 707/E17.01 |
| 6,243,761 B1 * | 6/2001 | Mogul | | H04L 29/06 |
| | | | | 709/217 |
| 6,275,692 B1 | 8/2001 | Skog | | |
| 6,289,358 B1 * | 9/2001 | Mattis | | G06F 17/30902 |
| | | | | 707/695 |
| 6,300,947 B1 * | 10/2001 | Kanevsky | | 715/866 |
| 6,345,279 B1 * | 2/2002 | Li | | G06F 17/30905 |
| 6,421,733 B1 | 7/2002 | Tso et al. | | |
| 6,457,030 B1 * | 9/2002 | Adams | | G06F 17/30905 |
| | | | | 707/E17.121 |
| 6,593,944 B1 * | 7/2003 | Nicolas | | G06F 17/30905 |
| | | | | 707/E17.121 |
| 6,594,682 B2 * | 7/2003 | Peterson | | G06F 17/30867 |
| | | | | 707/E17.109 |
| 6,792,575 B1 * | 9/2004 | Samaniego | | G06F 17/27 |
| | | | | 707/E17.121 |
| 6,871,236 B2 * | 3/2005 | Fishman | | H04L 29/06 |
| | | | | 709/213 |
| 6,920,488 B1 * | 7/2005 | Le Pennec | | G06F 17/30905 |
| | | | | 707/E17.121 |
| 6,955,298 B2 * | 10/2005 | Herle | | G06F 17/30905 |
| | | | | 235/472.01 |
| 6,983,331 B1 * | 1/2006 | Mitchell | | G06F 17/30905 |
| | | | | 707/E17.121 |
| 7,024,464 B1 * | 4/2006 | Lusher | | G06F 17/30905 |
| | | | | 707/E17.121 |
| 7,047,033 B2 * | 5/2006 | Wyler | | G06F 17/30905 |
| | | | | 455/552.1 |
| 7,054,935 B2 * | 5/2006 | Farber | | G06F 9/505 |
| | | | | 707/E17.119 |
| 7,072,984 B1 * | 7/2006 | Polonsky | | G06F 17/30905 |
| | | | | 707/E17.121 |
| 7,099,914 B1 * | 8/2006 | Hartmann | | H04L 67/02 |
| | | | | 707/E17.121 |
| 7,107,309 B1 | 9/2006 | Geddes et al. | | |
| 7,111,057 B1 * | 9/2006 | Sherman | | G06F 17/3089 |
| | | | | 707/999.01 |
| 7,114,007 B2 * | 9/2006 | Sasaki | | H04L 29/06 |
| | | | | 709/203 |
| 7,114,160 B2 * | 9/2006 | Suryanarayana | | G06F 17/30905 |
| | | | | 707/E17.121 |
| 7,136,857 B2 * | 11/2006 | Chen | | G06F 8/60 |
| 7,143,347 B2 * | 11/2006 | Su | | G06Q 30/0209 |
| | | | | 348/E7.063 |
| 7,188,216 B1 * | 3/2007 | Rajkumar | | G06F 17/30902 |
| | | | | 707/E17.12 |
| 7,221,370 B1 * | 5/2007 | Arnold | | G06F 17/30899 |
| | | | | 345/169 |
| 7,240,100 B1 | 7/2007 | Wein | | |
| 7,293,093 B2 * | 11/2007 | Leighton | | H04L 29/12009 |
| | | | | 707/999.01 |
| 7,337,392 B2 * | 2/2008 | Lue | | 715/236 |
| 7,376,716 B2 | 5/2008 | Dilley et al. | | |
| 7,472,178 B2 | 12/2008 | Lisiecki et al. | | |
| 7,574,486 B1 | 8/2009 | Cheng et al. | | |
| 7,693,959 B2 * | 4/2010 | Leighton | | G06F 17/3089 |
| | | | | 709/217 |
| 7,752,394 B1 * | 7/2010 | Rajkumar | | G06F 17/30902 |
| | | | | 709/216 |
| 7,761,591 B2 * | 7/2010 | Graham | | G06Q 40/02 |
| | | | | 709/204 |
| 7,818,506 B1 * | 10/2010 | Shepstone | | G06F 17/30902 |
| | | | | 709/217 |
| 8,060,581 B2 | 11/2011 | Day et al. | | |
| 8,132,099 B2 * | 3/2012 | Asakawa et al. | | 715/271 |
| 8,180,880 B2 * | 5/2012 | Basso | | G06F 17/30569 |
| | | | | 370/389 |
| 8,254,895 B2 * | 8/2012 | Holdsworth | | G06F 17/30905 |
| | | | | 455/414.3 |
| 8,312,222 B1 * | 11/2012 | Martin | | G06F 17/30902 |
| | | | | 711/133 |
| 8,321,568 B2 * | 11/2012 | Sivasubramanian | | G06F 17/30887 |
| | | | | 370/328 |
| 8,380,932 B1 * | 2/2013 | Martin | | G06F 17/30902 |
| | | | | 711/133 |
| 8,402,137 B2 * | 3/2013 | Sivasubramanian | | G06F 17/30887 |
| | | | | 709/200 |
| 8,447,837 B2 * | 5/2013 | Devanneaux | | G06F 17/30902 |
| | | | | 709/203 |
| 8,463,998 B1 * | 6/2013 | Scheevel | | G06F 17/30902 |
| | | | | 711/118 |
| 8,478,903 B2 * | 7/2013 | Farber | | G06F 9/505 |
| | | | | 709/219 |
| 8,543,667 B2 | 9/2013 | Hluchyj | | |
| 8,554,880 B2 * | 10/2013 | Shishido | | G11B 27/105 |
| | | | | 709/219 |
| 2001/0003828 A1 * | 6/2001 | Peterson | | G06F 17/30867 |
| | | | | 709/219 |
| 2001/0047394 A1 | 11/2001 | Kloba et al. | | |
| 2002/0010798 A1 | 1/2002 | Ben-Shaul et al. | | |
| 2002/0143822 A1 * | 10/2002 | Brid | | G06F 17/30905 |
| 2002/0161835 A1 | 10/2002 | Ball et al. | | |
| 2003/0009588 A1 * | 1/2003 | Bodlaender | | H04L 12/2803 |
| | | | | 709/238 |
| 2003/0023755 A1 * | 1/2003 | Harris | | G06F 17/30905 |
| | | | | 709/246 |
| 2003/0115365 A1 * | 6/2003 | Lindsey | | G06F 17/3061 |
| | | | | 709/246 |
| 2004/0054652 A1 * | 3/2004 | Teh et al. | | 707/1 |
| 2004/0093419 A1 * | 5/2004 | Weihl | | H04L 63/06 |
| | | | | 709/229 |
| 2004/0199665 A1 | 10/2004 | Omar et al. | | |
| 2004/0267707 A1 * | 12/2004 | Hayes-Roth | | G06F 21/6218 |
| 2006/0184639 A1 * | 8/2006 | Chua | | G06F 17/30905 |
| | | | | 709/217 |
| 2006/0274869 A1 | 12/2006 | Morse | | |
| 2007/0156845 A1 * | 7/2007 | Devanneaux | | G06F 17/30902 |
| | | | | 709/217 |
| 2007/0233706 A1 * | 10/2007 | Farber | | G06F 9/505 |
| 2007/0233884 A1 * | 10/2007 | Farber | | G06F 9/505 |
| | | | | 709/229 |
| 2008/0195761 A1 * | 8/2008 | Jabri | | H04L 65/605 |
| | | | | 709/250 |
| 2008/0208950 A1 * | 8/2008 | Kim | | H04L 29/06027 |
| | | | | 709/201 |
| 2009/0119388 A1 * | 5/2009 | Kikuchi | | H04L 67/2852 |
| | | | | 709/219 |
| 2009/0248787 A1 * | 10/2009 | Sivasubramanian | | G06F 17/30887 |
| | | | | 709/201 |
| 2009/0248858 A1 * | 10/2009 | Sivasubramanian | | G06F 17/30887 |
| | | | | 709/224 |
| 2009/0307337 A1 * | 12/2009 | Marshall | | H04L 67/303 |
| | | | | 709/220 |
| 2010/0153838 A1 * | 6/2010 | Arnold | | G06F 17/30899 |
| | | | | 715/234 |
| 2010/0268773 A1 * | 10/2010 | Hunt | | G06F 17/30905 |
| | | | | 709/203 |
| 2011/0016198 A1 * | 1/2011 | Shishido | | G11B 27/105 |
| | | | | 709/219 |
| 2012/0150993 A1 | 6/2012 | Flack et al. | | |
| 2013/0219024 A1 | 8/2013 | Flack | | |

OTHER PUBLICATIONS

U.S. Appl. No. 13/330,935, Flack et al.*
U.S. Appl. No. 13/330,935, Flack et al., Michael A. Chambers.*
Butler, Mark H., "DELI: A DElivery context LIbrary for CC/PP and UAProf," External Technical Report, Report No. HPL-2001-260, Sep. 25, 2001, 21 pages.

(56) References Cited

OTHER PUBLICATIONS

Butler, Mark H., "Using capability classes to classify and match CC/PP and UAProf profiles," Client and Media Systems Laboratory, HP Laboratories Bristol, Report No. HPL-2002-89, Apr. 16, 2002, 12 pages.
International Search Report for counterpart PCT Application No. PCT/US2011/066002, mailed Aug. 27, 2012, 5 pages.
Written Opinion for counterpart PCT Application No. PCT/US2011/066002, mailed Aug. 27, 2012, 9 pages.
Lum, A Context Aware Decision Engine for Content Adaptation, Pervasive Computing, col. 1, Issue 3, IEEE 2002, pp. 41-49.
Timothy W. Bickmore et al., Digestor: device-independent access to the World Wide Web, Computer Networks and ISDN Systems, vol. 29, (Sep. 1997), pp. 1075-1082.
Armando Fox, Steven D. Gribble, Eric A. Brewer, and Elan Amir, Adapting to network and client variability via on-demand dynamic distillation. In Proceedings of the seventh international conference on Architectural support for programming languages and operating systems (ASPLOS-VII). ACM, New York, NY, USA, 1996, pp. 1-11.
Fox and E. A. Brewer. Reducing WWW Latency and Bandwidth Requirements by Real-time Distillation, Computer Networks and ISDN Systems, vol. 28, (May 1996), pp. 1445-1456.
Berners Lee et al., Hypertext Transfer Protocol—HTTP/1.0, RFC 1945, Section 10.15, May 1996.
Liljeberg, Enhanced Services for World Wide Web in Mobile WAN Environment, Univ of Helsinki, Department of Computer Science, Series of Publications C, No. C-1996-28, Apr. 1996.
Anupam, Joshi et al. "Mowser: Mobile Platforms and Web Browsers" Bulletin of the IEEE Technical Committee on Operating System and Application Environments, vol. 8, No. 1, 1996, 4 pages.
Bharadvaj, Harini et al., "An Active Transcoding Proxy to Support Mobile Web Access," Reliable Distributed Systems, Proceedings of 17th IEEE Symposium on Reliable Distributed Systems, pp. 118-123 (1998).
Clinton Wong, Web Client Programming with Perl, Chapter 3, Learning HTTP, O'Reilly Online Catalog, 1st edition 1997.
Zenel, A Proxy Based Filtering Mechanism for the Mobile Environment, Columbia University PhD submission, 1998.
Brooks et al, "Application-Specific Proxy Servers as HTTP Stream Transducers," published at http://www.w3.org/Conferences/WWW4/Papers/56/, presented at 4th Int'l World Wide Web Conference, Dec. 11-14, 1995.
Office action from US Patent Office mailed Nov. 20, 2014 in U.S. Appl. No. 13/281,615.
Mark Butler, Current Technologies for Device Independence, Hewlett Packard Publishing Systems and Solutions Laboratory, HPL-2001-83, Internal accession date Apr. 4, 2001, Copyright 2001, 28 pages, downloaded Jan. 25, 2016, from http://www.hpl.hp.com/techreports/2001/HPL-2001-83.pdf.

\* cited by examiner

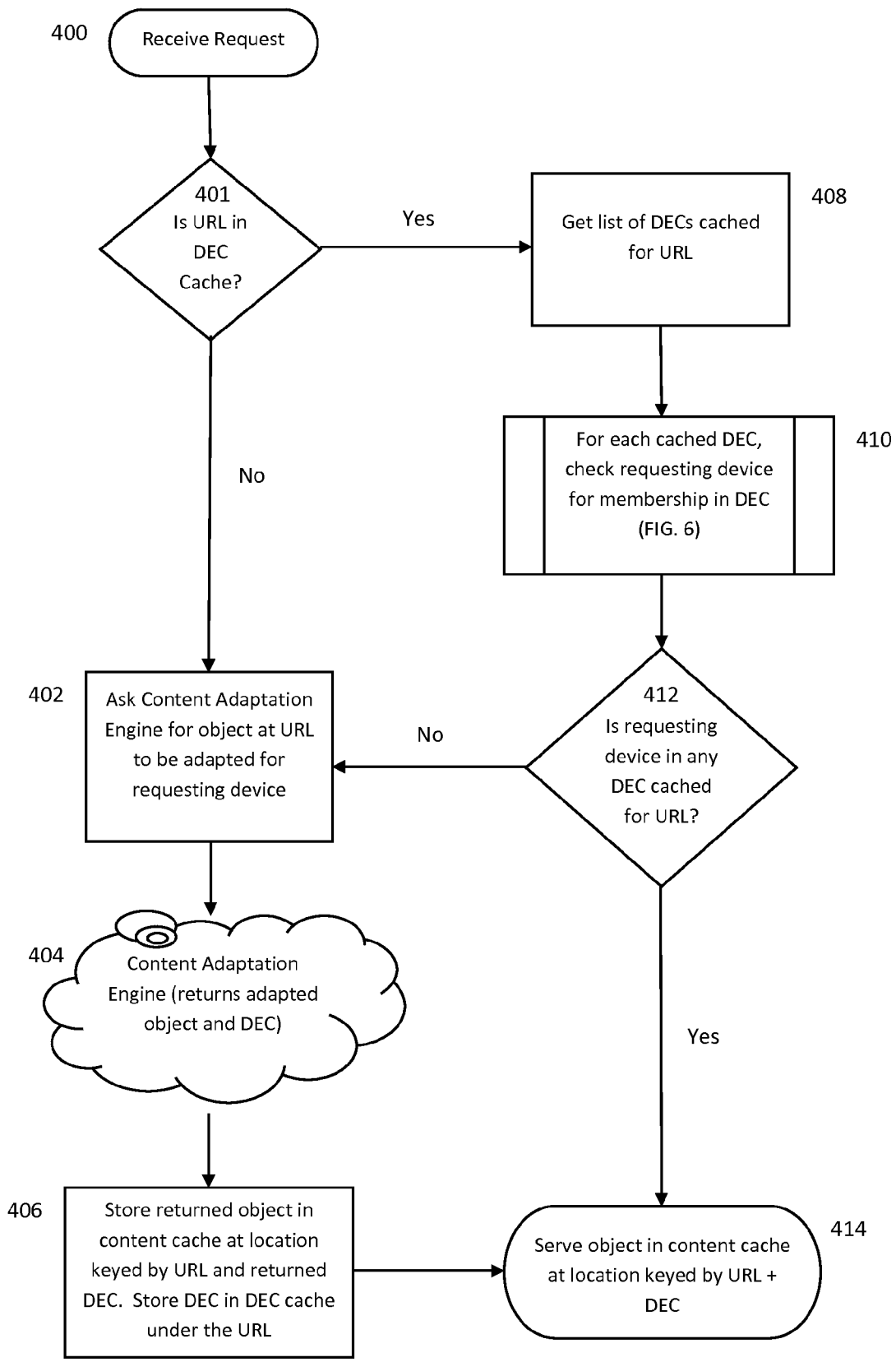
FIG. 4 – DEC Caching Process

Device-Equivalency Class (DEC) Cache

| URL_1 | DEC1 [key1=value1, key2=value2...]<br>DEC2 [key1=value1, key2=value2...]<br>... |
|---|---|
| URL_2 | DEC1 [key1=value1, key2=value2...]<br>DEC2 [key1=value1, key2=value2...]<br>DEC3 [key1=value1, key2=value2...]<br>... |

...

| URL_n | DEC1 [key1=value1, key2=value2...]<br>DEC2 [key1=value1, key2=value2...]<br>... |
|---|---|

Proxy's Content Cache

| URL_1 | Cached object (e.g., HTML, gif, etc.) unadapted |
|---|---|
| URL_1+ DEC1 | Cached object (e.g., HTML, gif, etc.) adapted for clients falling within DEC1 |
| URL_1 + DEC2 | Cached object (e.g., HTML, gif, etc.) adapted for clients falling within DEC2 |

...

| URL_n + DEC_m | Cached object (e.g., HTML, gif, etc.) at URL_n adapted for clients falling within DEC_m.<br>... |
|---|---|

FIG. 5

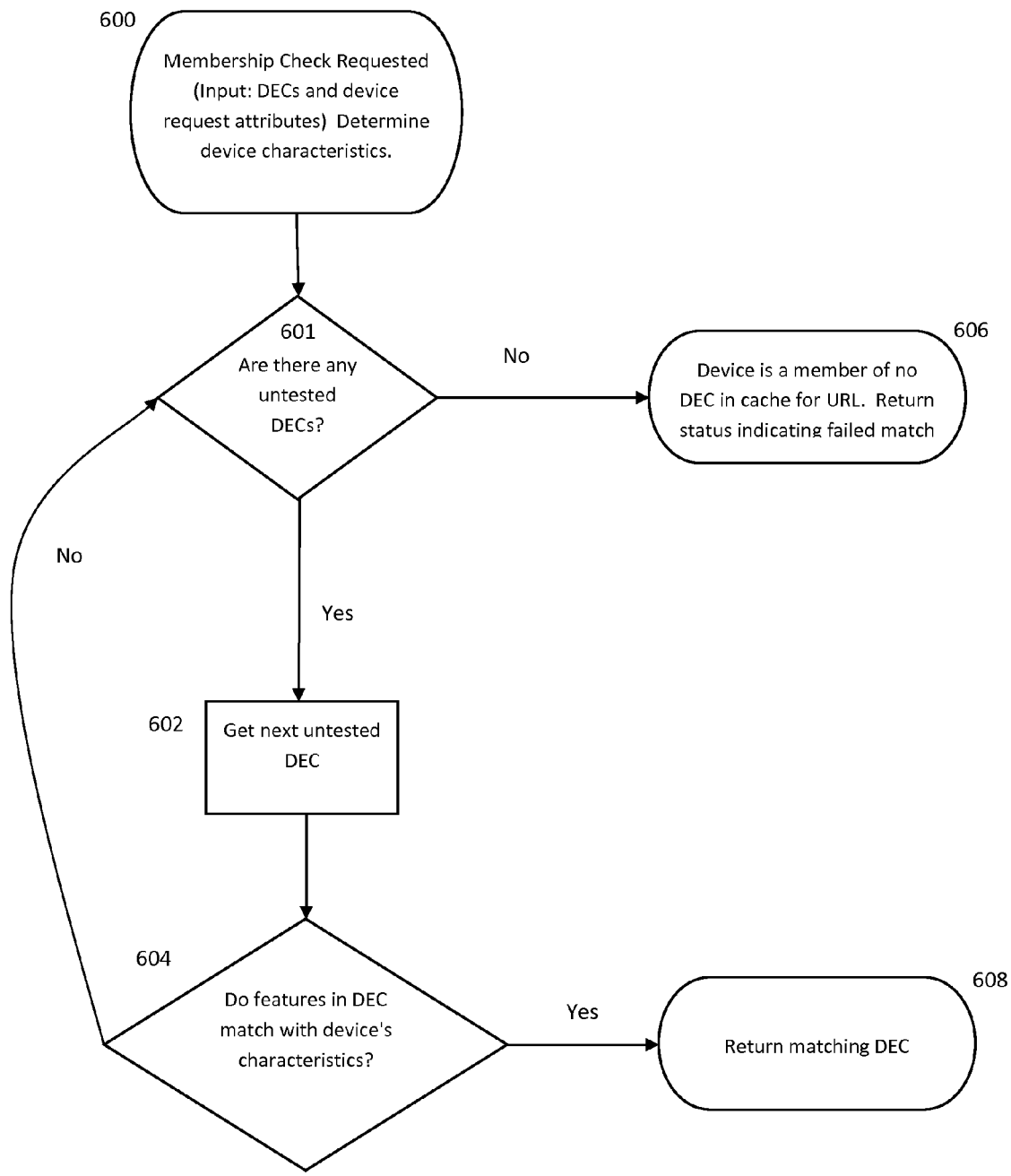
FIG. 6 – DEC Matching Service

METHODS AND SYSTEMS FOR DELIVERING CONTENT TO DIFFERENTIATED CLIENT DEVICES

REFERENCE TO RELATED APPLICATIONS

This application claims the benefit of priority of U.S. Provisional Application No. 61/424,940, filed Dec. 20, 2010, the teachings of which are hereby incorporated by reference in their entirety.

BACKGROUND

1. Technical Field

The present application generally relates to the delivery of content to client devices, including in particular the delivery of content to a variety of devices with different characteristics.

2. Brief Description of the Related Art

As is known in the art, a distributed computer system may be used to deliver content to client devices in both wireless and other fixed-line environments. One such distributed computer system is a "content delivery network" or "CDN" that is operated and managed by a service provider. The service provider typically provides the service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. Typically, "content delivery" refers to the storage, caching, or transmission of content, or streaming media and applications on behalf of content providers, and ancillary technologies used therewith including, without limitation, DNS request handling, provisioning, data monitoring and reporting, content targeting, personalization, and business intelligence.

Content delivery to mobile devices such as a smartphone or tablet, presents unique challenges. Often such devices have limited capabilities in terms of their display or processing power, and they typically receive content via wireless connections that are of limited bandwidth in comparison to fixed-line environments.

One approach for delivering content to such devices so is through the use of transcoders, which take in web content (e.g., a web page) and transform or re-author that content into a format suited to the display and data transmission capabilities of the device. A variety of transcoding algorithms are known in the art. Exemplary approaches for transcoding content are described in U.S. Pat. No. 7,047,033 and US Patent Publication 2003/0115365, the teachings of both of which are hereby incorporated by reference. Transcoding of image, video, and other content is described in Bharadvaj, Joshi et al., "An Active Transcoding Proxy To Support Mobile Web Access," Reliable Distributed Systems, Proceedings of 17th IEEE Symposium on Reliable Distributed Systems, pp. 118-123 (1998), the teachings of which are hereby incorporated by reference.

Alternatively, a content provider might author several versions of content in the first instance, each version being adapted for a particular device. The number such versions can rapidly escalate, however, and the availability of multiple versions does not address how to efficiently deliver an appropriate version in response to a particular request.

While the foregoing approaches relate to adaptation techniques, they do not fully address the problems of delivering tailored content at scale. Hence, there is a need to provide methods and systems for providing device-adapted content in distributed computing systems and for advantageously managing adapted content in such systems. The techniques disclosed herein address these and other needs that will become apparent in view of the following disclosure.

SUMMARY

Described herein are methods and systems for improving the delivery of content that is suited for different client devices, such as content adapted for particular mobile devices. For example, described herein is a proxy cache server that has a content cache for storing previously retrieved objects, such as web pages or multimedia files. Several versions of at least some objects (including a default version, potentially) can be stored in the content cache, each of the versions representing an object suited for a particular set of one or more client devices. These versions may have been adapted on-the-fly by a content adaptation engine (e.g., in response to previous client-device requests) or may represent several alternate versions of an object authored and published by a content provider. A device-equivalency-class data structure (referred to as DEC cache in some examples) is maintained at the proxy. This data structure facilitates a determination of which, if any, of the cached versions can be used to service a given request from a particular client device. Typically, the determination turns on whether the device characteristics that were used to adapt the cached content match the characteristics of the particular client device that is subsequently requesting the content. In many cases, the DEC cache may reflect only some (not necessarily all) of the characteristics that were used for adaptation, improving the chances of a cache hit. In effect this creates device equivalency classes, whose breadth is configurable. Furthermore, the characteristics may be expressed in ranges, such a match occurs when a given client device has characteristics that fall within the specified ranges for a DEC.

If a particular version of content can be used, then it can be delivered to the client directly from the content cache. In many instances, a default version will be available (e.g., from origin or from the cache) if all other versions fail to match. Alternatively, if there is no matching version, the content can be adapted at request time by a content adaptation engine. The result of this real-time adaptation can be stored in the DEC cache and associated with a newly defined class definition, enabling it to be re-used for future client requests that fall within the class.

By way of further illustration, in one non-limiting aspect of the invention, a content server (or more than one content server, acting cooperatively) operates as follows to facilitate the delivery of content to a client. The content server receives a request for web content from a client device, e.g., a mobile device such as a smartphone, or a tablet, or another connected device. Typically, the content server is acting as a proxy cache server. The content server determines that the client device has certain characteristics from information in the request, such as the user_agent or other header information. It determines that a set of one or more of the client device's characteristics match one of a plurality of sets of stored characteristics for client devices. This set of characteristics may be all of the device's characteristics that were determined from the request, but it is typically less than that.

The stored sets of device characteristics are preferably specified in a control file, in a header received from an origin server, in information received from a content adaption engine, or from another source. Each of the sets of stored characteristics is associated with a version of the web content.

The content server obtains the version of the web content associated with the matching set of stored characteristics, e.g., retrieving that version from cache. If not cached, or depending on the implementation, the version might be obtained from an origin server, or from a content adaptation engine. Whatever the source, the content server serves that version to the client device in response to the request for web content.

If it was not cached, then the content server caches the matching version of the web content in the local cache. Preferably, it uses a cache key associated with the matching set of stored characteristics. To manage access to the local cache, the content server preferably maintains a data structure, sometimes referred to as a DEC cache herein, that maps a universal resource locator (URL) or other web content identifier to the plurality of versions of the web content.

The characteristics referred to above can take many forms, but preferably are represented as key/value pairs, where the key represents a property of the device, e.g., screen_size=320 px. The value may be a range, e.g., 100-300 px. The values and ranges are not limited to numerical values, but may also include Booleans, strings, etc., such as for an operating system: OS={OS_name1, OS_name2}. Thus, the content server determines whether a given characteristic of the first client device matches a given stored characteristic by determining whether the value of the given property of the first client device matches the value, or falls within the range of values, of the given stored property.

In another non-limiting aspect of the invention, a content server delivers content to a client over a computer network using the following approach. The content server receives a request for web content from a first client device, typically a mobile device such as a smartphone or tablet, and so on. The content server obtains the web content from local cache (if available) or from a remote server. The remote server is often an origin server associated with a content provider customer who has offloaded delivery of content to the content server, which is operated by a content delivery network service provider.

The content server modifies the web content to create web content adapted for the first client device. This modification may be performed in a variety ways known in the art, but it takes into account one or more characteristics of the first client device. The characteristics of the first device can be determined by mapping a user_agent string, or other header information in the request from the first client device, to set of characteristics. The content server caches the modified web content.

Next, the content server receives a request for the web content from a second client device. The content server determines whether the modified web content is valid to be served to the second client device, that determination including a determination of whether the second client device has at least one of the one or more characteristics. The content server sends the second client device the modified web content from the cache, if it is valid to be served to the second client device. If not, the content server can obtain a version modified for the second client device by adapting the content, as it did for the first client device.

As noted above, the determination of whether the modified web content is valid to be served to the second client device typically includes a determination of whether the second client device has some or all of the one or more characteristics that were used to modify the content for the first client device. This may be achieved by specifying a configurable range of values, as was described earlier. Note that another approach involves defining a tolerance range for the values, e.g., match if the second device's screen width is within +/−10% of the size of the first device's screen width.

The content server typically consults a data structure that maps web content identifiers to a plurality of versions of web content. Each version is identified by a cache key denoting a device equivalency class (DEC). The DEC identifies one or more characteristics of the client device that were taken into account in adapting the web content to create the given version.

Another, non-limiting aspect of the invention relates to a content server that receives a request for web content from a first client device and obtains the requested web content from a remote server or from a local cache. The content server obtains a version of the web content modified for the first client device. The content server assigns a class identifier (e.g., device equivalency class, or DEC) to that version. The class identifier can be thought of as a an equivalency bucket: other devices that qualify for the class can be served with the same version of the content. Typically, the content server caches the subject version using the class identifier as part or all of a key.

Assume that the content server then receives a request for the web content from a second client device. The content server determines whether the second client device falls within the class identified by the class identifier. If so, the content server sends the second client device that version of the web content from the cache. If not, then the content server obtains another version of the content by having the content modified for the second client device.

The number of characteristics constituting a particular class is typically configurable. It may represent fewer than the number of characteristics actually taken into account to create a given version of the web content.

As those skilled in the art will recognize, the foregoing description merely refers to examples of the invention. It is not limiting and the teachings hereof may be realized in a variety of computer systems, methods, apparatus, and non-transitory computer-readable media.

BRIEF DESCRIPTION OF THE DRAWINGS

FIG. 4 is a flow diagram illustrating one embodiment of a process for caching according to the teachings hereof;

FIG. 5 is a schematic diagram illustrating one embodiment of a device equivalency class cache and a proxy's content cache;

FIG. 6 is a flow diagram illustrating one embodiment of a process for determining whether a given requesting client device is a member of a device equivalency class.

DETAILED DESCRIPTION

The following description sets forth embodiments to provide an overall understanding of the principles of the structure, function, manufacture, and use of the methods and apparatus disclosed herein. The methods and apparatus described herein and illustrated in the accompanying drawings are non-limiting examples; the scope of the present invention is defined solely by the claims. The features described or illustrated in connection with one exemplary embodiment may be combined with the features of other embodiments. Such modifications and variations are intended to be included within the scope of the present invention. All publications and references cited herein are expressly incorporated herein by reference in their entirety.

1.0 Content Delivery Networks

Figure 1:
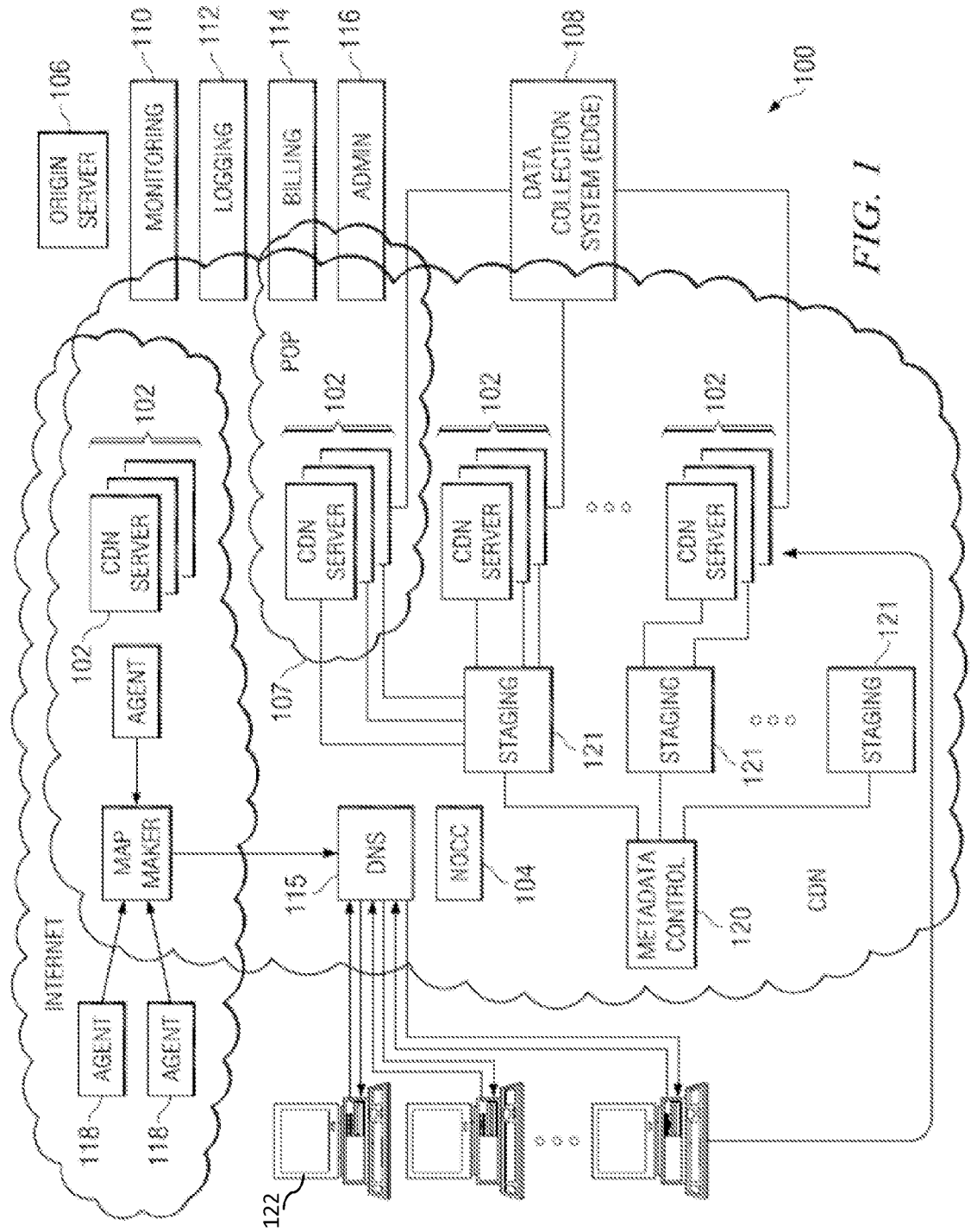
FIG. 1 is a schematic diagram illustrating one embodiment of a known distributed computer system configured as a content delivery network.
Figure 2:
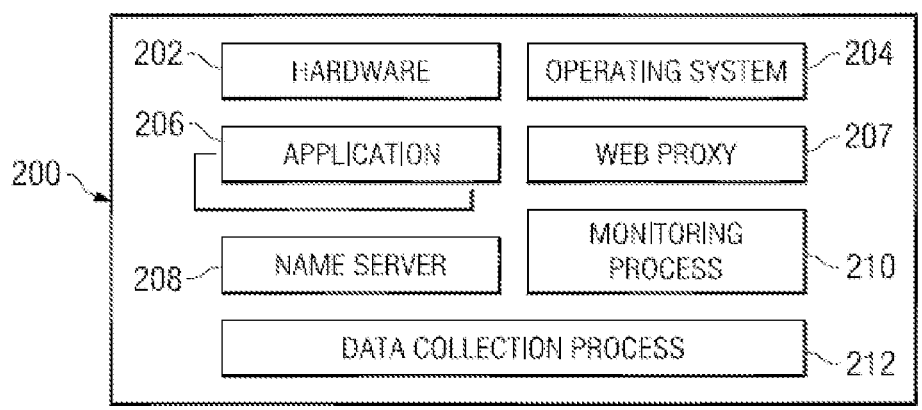
FIG. 2 is a schematic diagram illustrating one embodiment of a machine on which a content delivery server in the system of FIG. 1 may be implemented.

The methods and systems disclosed herein may be implemented in the context of a distributed computer system, e.g., a content delivery network ("CDN") as illustrated in FIGS. 1-2; although they are not limited to such implementations.

With respect to FIG. 1, a distributed computer system 100 is configured as a CDN and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites affiliated with content providers, such as web site 106, offload delivery of content (e.g., HTML, embedded page objects, streaming media, software downloads, and the like) to the distributed computer system 100 and, in particular, to the CDN's content servers (also called "edge servers" in light of the possibility that some may be located near an Internet "edge"). Such content servers may be grouped together into a point of presence (POP) 107.

Typically, content provider customers offload their content delivery by aliasing (e.g., by a DNS CNAME) given content provider domains or sub-domains to domains that are managed by the service provider's authoritative domain name service, more details of which are set forth in U.S. Pat. Nos. 7,293,093 and 7,693,959, the disclosures of which are incorporated by reference. End users operating client machines 122 that desire the content are directed to the distributed computer system, and more particularly to one of the content servers on the machines 102, to obtain that content more reliably and efficiently. The content servers service the client requests, e.g., by retrieving requested content from a content server cache, retrieving the requested content from another content server, or by retrieving the requested content from the origin server 106 (and, potentially, storing that content in the cache to service future requests).

Although not shown in detail in FIG. 1, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the CDN servers.

As illustrated in FIG. 2, a given machine 200 comprises commodity hardware (e.g., an Intel Pentium or other processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine typically includes one or more media servers, such as a Windows Media Server (WMS) or Flash server, as required by the supported media formats.

Client machines 122 include conventional personal computers, laptops, other digital data processing devices. Client machines 122 may also include mobile devices, which may include any of a variety of smartphones or personal digital assistants (PDAs), running a client application (e.g., a web browser) that issues requests for content from the servers, receives responses from the servers, and processes and displays the received content for a user.

A given content server in the CDN is typically configured to provide one or more extended content delivery features, preferably on a domain-specific, customer-specific basis, preferably using configuration files that are distributed to the content servers using a configuration system. A given configuration file preferably is XML-based and includes a set of content handling rules and directives that facilitate one or more advanced content handling features. The configuration file may be delivered to a content server via the data transport mechanism. U.S. Pat. No. 7,111,057, the disclosure of which is incorporated herein by reference, illustrates a useful infrastructure for delivering and managing content control information, and this and other server control information can be provisioned by the CDN service provider itself, or (via an extranet or the like) the content provider customer who operates the origin server.

The CDN may include a network storage subsystem, such as described in U.S. Pat. No. 7,472,178, the disclosure of which is incorporated herein by reference.

The CDN may operate a server cache hierarchy (Cache-H) to provide intermediate caching of customer content; one such cache hierarchy subsystem is described in U.S. Pat. No. 7,376,716, the disclosure of which is incorporated herein by reference.

The CDN may provide secure content delivery among a client browser, content server and customer origin server in the manner described in U.S. Publication No. 2004/0093419, the disclosure of which is incorporated herein by reference. Secure content delivery as described therein enforces SSL-based links between the client and the content server process, on the one hand, and between the content server process and an origin server process, on the other hand. This enables an SSL-protected web page and/or components thereof to be delivered via the content server.

2.0 Delivery of Device-Adapted Content

At the outset, it should be understood that while for purposes of illustration the following embodiments sometimes refer to mobile devices, the methods and systems described herein are not limited to the adaptation/caching of content for mobile devices. The methods and apparatus disclosed herein are broadly applicable to the delivery of content to client devices that are differentiated in terms of their capabilities, limitations, or other hardware and/or software characteristics. Examples of differentiating characteristics include display, processing, installed software (operating system, browser), support for certain technologies (e.g., Flash), form factor, intended deployment, and so on.

A mobile device such as a smartphone or tablet represent particular examples of client devices, and can be contrasted with the traditional desktop PC. They are therefore convenient to use for illustrative purposes. In accordance with the teachings hereof, content can also be adapted and delivered to other client devices, e.g., such as gaming systems, televisions, e-readers, connected devices, and so on, in accordance with the teachings hereof. Furthermore, content may be adapted for different browsers running on the same device.

Figure 3:
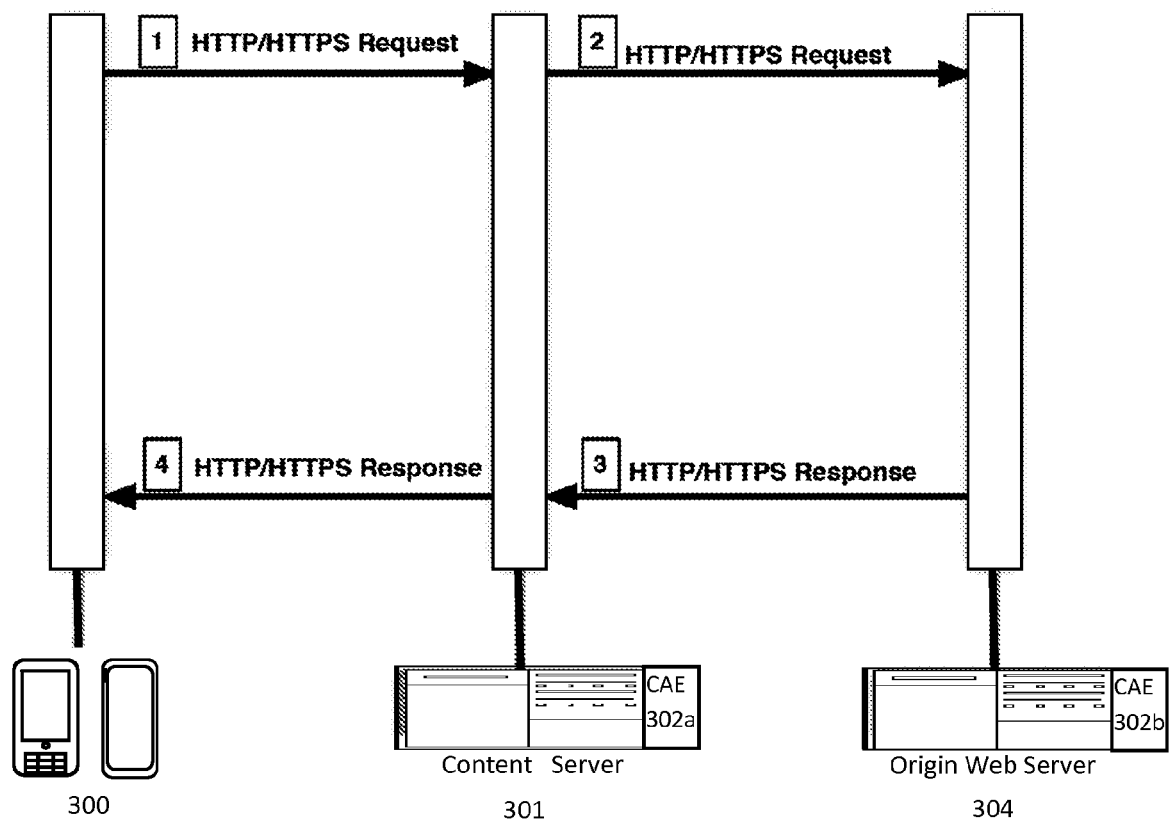
FIG. 3 is a schematic diagram illustrating one embodiment of a communication flow amongst a client, a content server, and an origin server.

FIG. 3 is a block diagram illustrating a flow of messages between a mobile client device 300, a content server 301, and an origin server 304. For ease of illustration, in FIG. 3, these components are shown separate from the larger context of the content delivery network 100, but they correspond in functionality to the apparatus described above in connection with FIGS. 1-2.

In this embodiment, content server 301 contains a content adaptation engine (CAE) 302a component. This component may be a routine or set of routines incorporated into an HTTP proxy process running on the content server 301, or a separate application executing in the content server machine. Alternatively, the content adaptation engine can be implemented in the origin server, as shown by CAE 302b. Generally, the content adaptation engine 302a-b adapts content for delivery to and display by the particular mobile device 300 that requested it, using for example conventional transcoding and adaptation techniques.

As shown in FIG. 3, the mobile device 300 makes requests for content to the content server 301. That content may include, for example, an HTML document representing a web page on the origin site. In many cases, the mobile device 300 will have been directed to the content server 301 by the DNS system of a CDN after the mobile device makes a request for content associated with a domain name associated with an origin server 304, as described above in connection with FIGS. 1-2.

Turning to the information flow illustrated in FIG. 3, in step 1, the content server 301 receives a request for content from the mobile device 300, typically an HTTP 'get' request for content at a particular URL. The content server 301 may check its cache to determine if it already has a copy of the requested content. Assume for purposes of illustration that the requested content has not yet been cached, or was previously cached but has expired due to the lapsing of a time-to-live value for example, then the content server 301 experiences a cache miss. In step 2, the content server 300 issues a request to the origin server 304 for the content, and the origin server 304 responds with the requested content (unadapted) in step 3. To be able to respond to the mobile device 300 with adapted content, the content server 301 makes a request to the content adaptation engine 302a to adapt the content for the particular mobile device 300, based on the characteristics of that mobile device 300. Alternatively, the origin server 304 may use content adaptation engine 302b to return adapted content in step 3, obviating the need for the content server 301 itself to perform the adaptation.

In performing such adaption, which is also referred to as transcoding or "mobilizing" the content, the content adaption engine (whether 302a or b) considers the characteristics of the client device 300.

The client device characteristics can be determined in many different ways, but in one embodiment can be determinate at least in part from the 'user_agent' string supplied by the mobile device 300 in the HTTP/HTTPS header of its request in step 1. In some cases, other request headers or other information from the request may be used instead of or in addition to the user_agent string. In one example, the device characteristics are obtained from a device description resource that maps a user_agent or other information to a set of characteristics. Known such resources include WURFL (wireless universal resource file) and Device Atlas. It is noted that if the origin server 304 is performing the adaptation with content adaptation engine 302b, then in step 2 (FIG. 3) the content server 301 is preferably configured to send the client device characteristics to the origin server 304 with the request for content.

The process for adapting (sometimes referred to as transcoding or mobilizing) the content may take a variety of forms. It is not limited to a particular technique; it may be performed in any conventional manner, as modified by the teachings hereof. For example, the layout of a requested web page may be adjusted and inline images resized/resampled/recolored in accordance with the display size and capabilities of the target device/browser. Video content may be replaced by representative frame captures. Unsupported content or tags may be omitted, or modified to a supported type (as certain devices/browsers do not support certain types of content, e.g., certain video formats). Content exceeding a threshold size may be blocked. In some cases, a single web page may be broken into multiple pages. Additionally, compression or other data reduction techniques may be employed in order to compensate for a slower network connection to the mobile device.

Following adaptation, the content adaption engine 302a-b returns the adapted content and in step 4 the content server 301 serves it to the mobile device 300. That delivery may trigger the mobile device to make (e.g., in the case of an adapted HTML page) requests for additional content referenced therein, causing steps 1-4 to repeat.

2.1 Caching—Overview

In one embodiment, to improve the responsiveness of the content server 301, the content server's HTTP proxy process caches the adapted content returned from content adaptation engine 302a-b. By doing so, the content server 301 need not retrieve the content from the origin server 304, nor call the content adaptation engine 302a to adapt that content, in order to service the second request for the same content. Rather, as previously mentioned, at step 1 of FIG. 3 the content server may check its cache to determine if it already has the adapted content (and, e.g., that it has not expired or is otherwise valid for delivery). If so, it returns the cached adapted content to the mobile device 300.

As a result of this caching of adapted content, the proxy's content cache may hold multiple entries for a given piece of content. These entries correspond to different versions of the content that were adapted for different requesting devices. Thus, for example, multiple versions of a web page may be present in the cache. Preferably, each version is valid to serve not just for an individual device, but a given set or class of requesting devices. Additionally, in this embodiment, the content server 301 maintains a data structure to track content that has been adapted for particular requesting devices. This data structure is used to manage access to the content cache so as to determine, among other things, whether to use cached content to respond to subsequent requests from different requesting devices, based on whether they have characteristics similar to those client devices that were previously serviced. For convenience of description, the data structure is referred to herein as a device equivalency class (DEC) cache, to distinguish it from the proxy's main content cache. With the foregoing by way of introduction, the approach will be described in more detail below.

2.1.1 Caching Device-Adapted Content with DEC Cache

A content server 301 running an HTTP proxy contains consolidated rule-sets for fast matching of user-agent strings against known client devices, upon receipt of a client request. The output of this process may be a simple true/false to determine if the responsive content should be forwarded to a content adaptation engine for creation of adapted content for the given device, such as a mobilized page for a mobile device, or whether the content can be served "as-is" from the content cache. If the latter, then an identification of which cached version of the content to serve can be provided.

Many implementations are possible. In one embodiment, when the content adaptation engine 302a-b returns adapted content to the content server 301, the content server can cache the output in its content cache using the user-agent string in the cache key. This ensures correct operation but reduces the positive cache hits, since any difference in a user_agent string in a subsequent request results in cache miss. As an improvement, in an alternate embodiment, the content server may use a canonical serialization of the device characteristics for the mobile device, as this would allow identical devices to make cache hits, but given the hundreds of characteristics per mobile device, and the fact that only one minor value difference is necessary to be different with this approach, it is likely that not many would be identical.

Another approach is to enable the content server to know which device characteristics and values were taken into consideration by the content adaptation engine 302a-b in creating the adapted content, so that only such characteristics relevant to the adaptation are considered in device equivalency for caching purposes. For mobile adaptation, this means that characteristics relevant to the mobilization process are used caching the content—typically this is fewer than all of the known characteristics for the device. For example, for a given adaptation, if the only considerations were for example that a device screen was 320 pixels wide and the device supports Javascript, then the content could be cached in the content server in such a way as to allow any device that was also 320 px wide and supported Javascript to be immediately returned the same adapted content from the cache (subject to other normal time to live (TTL)/no-store metadata rules), even if it had been originally adapted for another client device with other characteristics not relevant to the adaptation process.

In the context of FIG. 3, above, when the content adaption engine 302a returns the adapted content, it also includes information indicating what characteristics were taken into account. If the content adaptation is being done by the origin server with content adaptation engine 302b, then the origin server returns this information in step 4 along with the adapted content. Note that the origin server might specify a range of characteristics, to indicate that not only that certain characteristics were taken into account, but that the adapted content can be used to serve other devices in the future that fall within the range. In one implementation, this information can be returned as part of a Vary header in HTTP. Hence, the approach may be further generalized to allow content provider customers (via origin servers) to emit headers to the content server to express equivalencies.

This approach takes advantage of the fact that for many groups of mobile and other devices, such as related smartphone versions/models, the output of the adaptation may be identical. This technique is not restricted to naturally related product groups/families and can in fact match equivalencies across brands and product lines—it comes down to the technical mobilization-relevant characteristics alone.

It should be understood that all adaptation-relevant characteristics need not be considered for adaptation-equivalency amongst devices. For example, in the incremental case, the performance improvement resulting from defining broader equivalency classes (and hence enabling more positive cache hits) may be more desirable than the display improvement that results from using narrower classes defined by a wider array of adaptation-relevant characteristics. Weighting such factors provides a way to tradeoff response speed (from cache hits) versus optimization granularity (from consideration of wider/narrower numbers of characteristics). In some cases, a content provider customer of a CDN may be able to provide weights to such factors and thereby control the foregoing response characteristics of the content servers. In short, number of characteristics to be used can be controlled by configuration parameters.

Hence, according to one embodiment, there is provided a modification to a content server that permits it to take advantage of equivalencies calculated for the first client request above to the content adaptation engine in serving other requests from the content cache. Such equivalencies may be used for cache management as device equivalency classes (DECs). An example of use of a DEC, an example of which is provided below.

2.1.2 Caching Logic Example
Abstracted Terminology & Concepts for Purposes of Exemplary Logic
Proxy=Content Server Running Web Proxy Process
CAE=Content Adaptation Engine
Request Attributes=user-agent string
Device Characteristics=key/value pairs from a device description resource, such as
WURFL or Device Atlas
DEC=Device Equivalency Class
DEC Cache=a data structure that exists on the Proxy which maps each URL (key) to a (value) list of sets of key/value pairs.
Example DEC Cache with one URL and two DEC's for it: /url1=>[[key1=value1,key2=value2], [keyX=valueX,keyY=valueY]]Examples of key/value pairs are device characteristics relevant to adaptation, e.g., screen width=320 px; javascript_support=false. The key typically represents a property of a device, and the value specifies the value or a range of values for that property. Thus, screen_width could be equated to a range such as 100-300 px, or 200 px[+/−100 px], etc. The range may be continuous or discrete. For example, a property be specified with reference to a range of discrete values forming a set, such as OS=iOS, Android, etc, or browser=IE, Firefox, Opera, etc.

FIG. 4 is a flow chart illustrating one embodiment of a process for caching with device equivalency classes. The corresponding steps are described below.

In Step 400, a request is received at the Proxy. Typically the request is an HTTP request and includes user_agent or other client identifying information in a header. In Step 401, the Proxy decides if the URL is in the DEC Cache as a key. FIG. 5 illustrates the DEC cache in a table that contains, for each URL for which there is cached content, a list of DECs associated therewith that represent the various versions of the content that have been stored in the Proxy's content cache. Note that keying the cache using URLs is typical, but a web content identifier other than a URL could be used.

If the requested URL is found in the DEC Cache, then the collection of DECs are retrieved in Step 408 and passed to a function that determines whether the given client device (as identified by user_agent string or otherwise) is a member of any DEC. That is, Step 410 represents a membership function that takes as input the DEC Cache value (a list of DEC's) and request attributes (user_agent or otherwise) and gives as output a DEC match or 'null' for no match. The membership function is illustrated in FIG. 6.

Turning to FIG. 6, in Step 600, the Device Characteristics are determined, typically using a service that is more local than the CAE but may be inside or outside the Proxy. This may involve consulting a device description database. In step 601, iterate over the list of DECs. For each DEC constituent, check the value of the same key from the Device Characteristics with the DEC value and confirm that the values are identical. (Steps 602, 604). Note that a configuration may specify that only a certain level of correspondence is necessary for a "match." (E.g., device characteristics may not be exact matches but allowed to fall within predetermined tolerances of the DEC, such as a screen width of 330 px being "matched" to a screen width of 320 px in the DEC.) In Steps 606, 608, return either a matching DEC or the absence of a matching DEC.

Returning to FIG. 4, in Step 412, determine if the requested device matched to a DEC cached for the URL. If yes, then serve content from main content cache under key URL+DEC. (Step 414 and shown with the dotted lines in FIG. 5.) If not, then move to Step 402, which is the same as if no URL has been found in the DEC cache in the first place at Step 401. In Step 402 and 404, the Proxy goes forward to the CAE for the content. When CAE replies, expect a header in the response such as X-Equivalency-Class: key1=value1,key2=value2. This header has been computed by the CAE as any characteristic that was taken into consideration during the construction of the adapted content. Conversely any characteristic not taken into consideration should be omitted. Canonical order for keys is unnecessary.

In Step 406, store the DEC in the DEC Cache under the key URL. The DEC represents a new DEC to take into account for future requests. Store the content in the main content cache under key URL+DEC. The two stored cached entries in the two caches expire together (the same TTLs). In step 414, serve content from main content cache under key URL+DEC.

It is noted that Steps 402-406 of the above flow illustrate the process of building a table in the 'DEC Cache' at the content server. The DEC Cache is constructed in this case by the CAE reporting back in an HTTP header, although in other embodiments equivalency classes can be emitted by the origin server 304. One potential implementation is to use the HTTP 'Vary' header for this purpose.

Note that in the foregoing implementation, the content cache key of URL+DEC can be used to purge the content cache by URL and/or by device equivalency class. Incorporating the URL+DEC approach into the DEC Cache allows the DEC Cache to be purged by, for example URL (master base purge for all URL) or by specific device equivalency class (using the DEC). The CAE may initiate such a purge, for example, upon determining that it will begin to take into account a different set of adaptation characteristics for given devices previously within a single DEC (in other words, splitting one DEC into multiple DECs), or vice versa.

2.2 Ambiguity in Matching DECs

In some cases, a given requesting device may match to more than one DEC in the DEC cache. A variety of algorithms can be used to resolve such an ambiguity. For example, of the matching DECs, the DEC to use could be (i) the most specific DEC or (ii) the most recent DEC. Alternatively, the upon hitting an ambiguity, the match process could be aborted and the content server could go back to the content adaptation engine to obtain a newly adapted piece of content. Preferably, the approach taken is configurable so that an administrator and/or content provider can select the desired approach for these cases.

3.0 Specifying DECs In A Control File

In the above embodiments, the characteristics defining a DEC (e.g., screen_size=320 px and so on) were specified by the content adaptation engine, be it a CAE in the content server or the origin server. However, this is not a limitation. The characteristics can be specified by a content provider customer (or a content server operator) separately from the content adaptation process.

In one embodiment, such characteristics are specified in a control file that is sent to the content server as part of its configuration for a given content provider customer. The control file may be XML-based metadata, such as is described in U.S. Pat. No. 7,111,057, the contents of which are hereby incorporated by reference (see also previously-mentioned U.S. Pat. Nos. 7,376,716 and 7,293,093, the disclosures of which were already incorporated by reference previously). The control file specifies the DECs that apply for a given site, a given URL or range of URLs. Upon receiving a request from a given client device, the content server matches the requesting device to one of the DECs. It then uses the URL+DEC to locate the appropriate cached version of the content. If no such version is cached, then the content server obtains the appropriate version from a content adaptation engine, e.g., CAE 302a-b, as described above. The content server may send to the CAE the device characteristics from the DEC that are to be taken into account when adapting the content.

If none of the DECs match (or only a catch-all "default" DEC is matching), then the content server can use a default version of the web content from cache or from origin. Preferably, such options are configurable.

In other embodiments, DEC functionality is provided by a process external to the content server. For example, a DEC service can be provided by another CDN server, or a server associated with a content provider customer or third-party provider. The content server makes requests to the service to obtain DEC definitions, or to invoke logic that performs the DEC matching function and returns the appropriate DEC.

3.1 Content Provider Configuration

As noted above, the granularity of the DEC cache function can be configurable on a content provider by content provider basis. For example, a given content provider may desire that device equivalency classes be narrowly defined (defined by more device characteristics), resulting in more finely adapted content for client devices, but potentially reducing responsiveness because of the reduced chance of a cache hit. Another content provider may desire that that device equivalency classes be broader (defined by fewer device characteristics), decreasing the cache footprint and increasing responsiveness because of the increased likelihood of a cache hit, but reducing the precision of the content adaptation.

Furthermore, in one embodiment, a given content provider can configure each of its sites, or even its pages, with different DEC granularity settings. Hence, for example, a content provider's home page may be associated with broadly defined equivalency classes, perhaps only based on one or two important characteristics. The home page will have a relatively high chance of a cache hit, resulting in higher performance. Pages deeper down in the site may be configured with more narrowly defined equivalency classes. These are merely examples.

4.0 Authoring Several Versions of Adapted Content

Note that the use of a request-time content adaption engine to create adapted versions of content is not limiting. In some cases, the content provider authors several versions of certain URLs. For example, for a given page, the origin server may publish foo_v1.html, foo_v2.html, and so on. One may represent a 'default' page useable when all other DECs do not apply, but the other versions correspond to a DEC and are adapted for devices defined by those DECs as part of the authoring process. Upon receiving a request, the content server matches the requesting device to a DEC and then uses that DEC to either retrieve from cache (as previously described, using URL+DEC) or to request that version of the page from the origin. In this case, typically each DEC points to a unique URL on the origin server that holds the appropriate version of the content. Since an origin server typically will not understand requests for URL+DEC, logic can be employed to convert such a request into an standard URL according to a suitable naming convention. For example, assuming a URL for a given object is www.customer.com/foo.html, URL+DEC1 is mapped to a URL specifying www.customer.com/foo_v1.html, while URL+DEC2 maps to www.customer.com/foo_v2.html, and the content server goes forward to request these objects from origin. Alternatively, the metadata control file can specify the forward URL to use for a given DEC.

In these implementations, preferably the DECs are specified in the control file (metadata), as previously described. However, it should be understood that the origin server could also be modified to send the DEC information during operation of the system, thereby building the DEC cache as described earlier in connection with FIG. 4 (e.g., steps 402-406). In effect, instead of adapting content to create the appropriate version at request time with CAE 302b, the origin server can simply select one of the pre-authored, adapted content versions and return that version, along with a list of device characteristics, indicating the range of devices for which the returned version is valid. The device characteristics returned by the origin may thus be broader than the specific values sent to the origin. For example:

Content server sends characteristics: Device: OS=Android, OSver=3.1.16

Origin server returns with vary header: OS=Android, OSver=3.*.*-4.*.*

Content server sends characteristics: Device_Model=BlackBerry Curve 3200

Origin server returns with vary header: Model=BlackBerry Curve*

In light of the foregoing, it should be understood from that the teachings hereof are not limited to caching applications but also extend to non-cacheable content, the DEC cache facilitating the forward requests from the proxy for adapted, non-cacheable content at origin.

5.0 Further Extensions

The mechanism for determining the list of device characteristics from the user_agent or other information in an HTTP request may be implemented as a lookup in one or more device databases such as WURFL, Device Atlas, or otherwise; it may also be a different mechanism provided by the content delivery provider, the origin, or a third party; the mechanism may or may not include device database lookup in its operation. A content server may run customer-expressed logic (e.g., via metadata) to facilitate the determination.

Moreover, the teachings hereof may be applied to non-device characteristics gleaned from the client request as well. Example non-device functions include fraud rank mapping, geographic request tagging, or authentication detection.

Hence, a content provider may desire that one version of content be served and cached for requests that exhibit characteristics leading to a low likelihood of fraud, while another is served for request that exhibit characteristics leading to a high likelihood of fraud, as determined by known fraud-detection techniques. Thus a "Fraud-Equivalency Class" or FEC may be employed.

Similarly, a content provider may desire one version of content to be served and cached for requests from authenticated users (e.g., "logged-in" requests) and another version for non-authenticated requests.

For the geographic applications, conventional geo-location functionality can be used to map information in the request, e.g., the client IP address, to an array of geographic characteristics, such as country, state, city, zip, and so on. These geographic characteristics can be organized into 'Geographic Equivalency Classes' and treated as above.

Example:

Content server sends characteristics gleaned from request: Country=US, State=FL

Origin server returns with vary header: Country=US, State=FL,GA,SC

Thus, this response indicates that the response is valid for future requests from several different states in the southeast US.

6.0 Computer-Based Implementation

The clients, servers, and other devices described herein may be implemented with conventional computer systems, as modified by the teachings hereof, with the functional characteristics described above realized in software, special-purpose hardware, general-purpose hardware modified or reconfigured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more processors to provide a special purpose machine. The code may be executed using conventional apparatus—such as a processor in a computer, digital data processing device, or other computing apparatus—as modified by the teachings hereof. In one embodiment, such software may be implemented in a programming language that runs in conjunction with a DNS-compliant name server (e.g., BIND).

While in some cases above a particular order of operations performed by certain embodiments is set forth, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Figure 7:
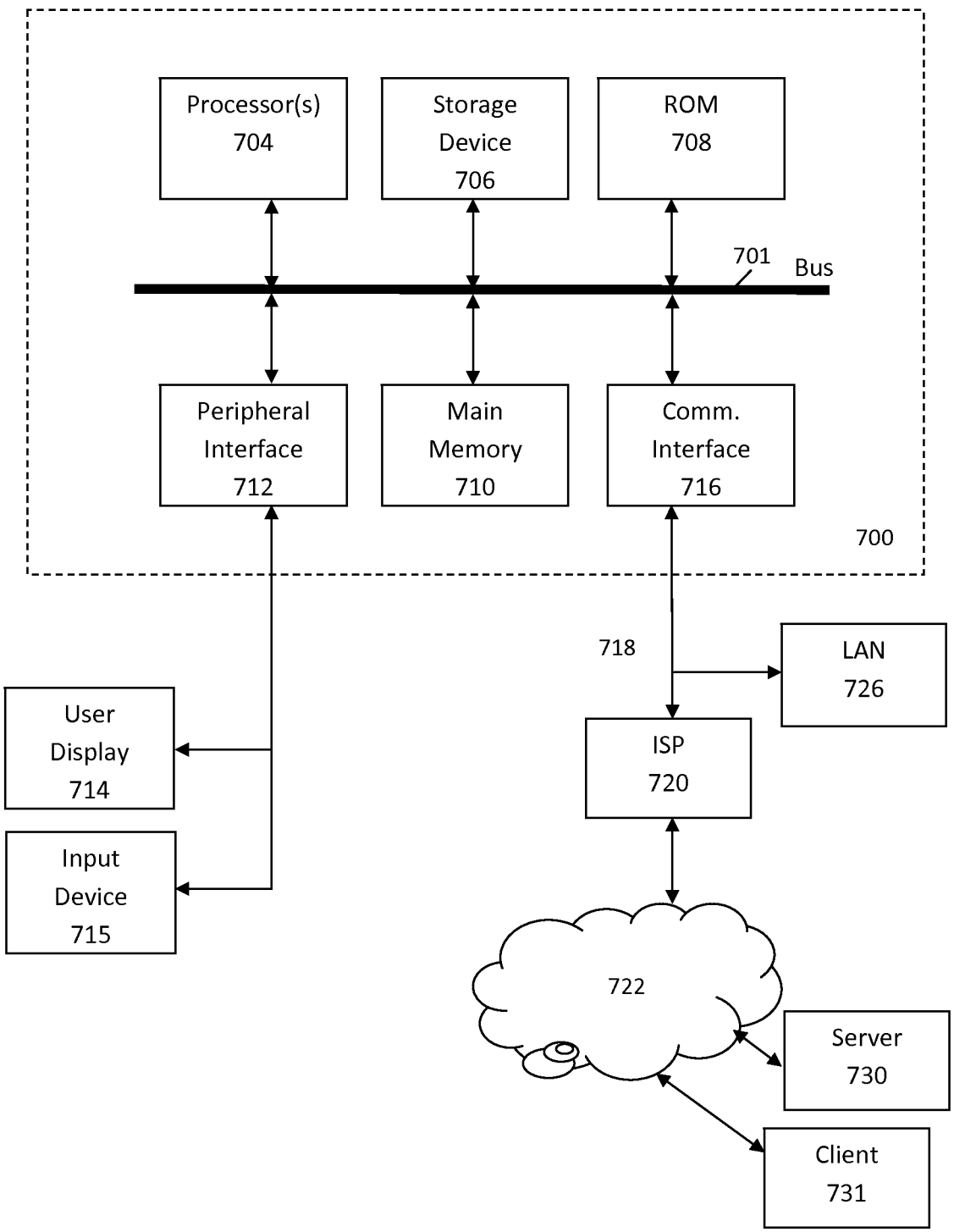
FIG. 7 is a block diagram that illustrates hardware in a computer system which may be used to implement the teachings hereof.

FIG. 7 is a block diagram that illustrates hardware in a computer system 700 upon which such software may run in order to implement embodiments of the invention. The computer system 700 may be embodied in a client device, server, personal computer, workstation, tablet computer, wireless device, mobile device, network device, router, hub, gateway, or other device. Representative machines on which the subject matter herein is provided may be Intel Pentium-based computers running a Linux or Linux-variant operating system and one or more applications to carry out the described functionality.

Computer system 700 includes a processor 704 coupled to bus 701. In some systems, multiple processor and/or processor cores may be employed. Computer system 700 further includes a main memory 710, such as a random access memory (RAM) or other storage device, coupled to the bus 701 for storing information and instructions to be executed by processor 704. A read only memory (ROM) 708 is coupled to the bus 701 for storing information and instructions for processor 704. A non-volatile storage device 706, such as a magnetic disk, solid state memory (e.g., flash memory), or optical disk, is provided and coupled to bus 701 for storing information and instructions. Other application-specific integrated circuits (ASICs), field programmable gate arrays (FPGAs) or circuitry may be included in the computer system 700 to perform functions described herein.

A peripheral interface 712 communicatively couples computer system 700 to a user display 714 that displays the output of software executing on the computer system, and an input device 715 (e.g., a keyboard, mouse, trackpad, touchscreen) that communicates user input and instructions to the computer system 700. The peripheral interface 712 may include interface circuitry, control and/or level-shifting logic for local buses such as RS-485, Universal Serial Bus (USB), IEEE 1394, or other communication links.

Computer system 700 is coupled to a communication interface 716 that provides a link (e.g., at a physical layer, data link layer, or otherwise) between the system bus 701 and an external communication link. The communication interface 716 provides a network link 718. The communication interface 716 may represent a Ethernet or other network interface card (NIC), a wireless interface, modem, an optical interface, or other kind of input/output interface.

Network link 718 provides data communication through one or more networks to other devices. Such devices include other computer systems that are part of a local area network (LAN) 726. Furthermore, the network link 718 provides a link, via an internet service provider (ISP) 720, to the Internet 722. In turn, the Internet 722 may provide a link to other computing systems such as a remote server 730 and/or a remote client 731. Network link 718 and such networks may transmit data using packet-switched, circuit-switched, or other data-transmission approaches.

In operation, the computer system 700 may implement the functionality described herein as a result of the processor executing code. Such code is typically read from or provided by a non-transitory computer-readable medium, such as memory 710, ROM 708, or storage device 706. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 718 (e.g., following storage in an interface buffer, local memory, or other circuitry).

It is noted that any trademarks appearing herein are the property of their respective owners and used for identification and descriptive purposes only, given the nature of the subject matter at issue, and not to imply endorsement or affiliation in any way.

Having described our invention, we claim:

1. A method operable in at least one content server for delivering content to a client over a computer network, the at least one content server having at least one hardware processor and memory holding instructions for execution by the at least one hardware processor, the method comprising:
    receiving a first request for first web content from a particular client device, the first web content being identified by a particular universal resource locator (URL);
    selecting, based at least in part on the particular URL, a particular set of classes from amongst a plurality of such sets, wherein the particular set has at least two classes, and wherein each class in a given set (i) is defined by a plurality of stored characteristics for client devices that the at least one content server matches against a given client device to determine membership in the class and (ii) is associated with a different version of web content, the at least one content server holding data that specifies, on a URL by URL basis, which set of classes to select based on a given URL;
    selecting a particular class from amongst the at least two classes in the particular set, at least in part because the particular client device has characteristics that match the stored characteristics of the particular class;
    obtaining the version of the first web content that is associated with the particular class;
    serving the obtained version of the first web content to the particular client device, in response to the request for first web content;
    receiving a second request for second web content from a second client device, the second web content being identified by a second universal resource locator (URL);
    selecting, based at least in part on the second URL, a second set of classes from amongst the plurality of such sets, wherein the second set has a different number of classes than the particular set of classes selected for the particular URL.

2. The method of claim 1, further comprising caching, in a cache local to the at least one content server, the version of the first web content associated with the particular class of stored characteristics.

3. The method of claim 2, wherein said caching uses a cache key associated with the particular class of stored characteristics.

4. The method of claim 1, wherein
    (i) a given characteristic of the particular client device has a property associated with a value;
    (ii) a given stored characteristic in the particular class of stored characteristics has a property associated with any of a value and a range of values,
    and the method further comprises determining whether the given characteristic of the particular client device matches the given stored characteristic by: determining whether the value of the given property of the particular client device matches the value, or falls within the range of values, of the given stored property.

5. The method of claim 1, wherein obtaining the version of first web content associated with the particular class of stored characteristics comprises any of: retrieving that version from a cache local to the at least one content server, retrieving that version from an origin server, retrieving that version from a content adaptation engine.

6. The method of claim 1, wherein at least one of the plurality of sets is specified in metadata stored at the at least one content server.

7. The method of claim 1, wherein at least one of the plurality of sets is specified in a header received from an origin server.

8. The method of claim 1, wherein the particular client device comprises a mobile device.

9. Computer apparatus for delivering content to a client device over a computer network, the apparatus comprising:
    circuitry forming at least one processor and memory holding instructions that, upon execution by the at least one processor, provide a special purpose machine that:
    (i) receives a first request for first web content from a particular client device, the web first content being identified by a particular universal resource locator (URL);
    (ii) selects, based at least in part on the particular URL, a particular set of classes from amongst a plurality of such sets, wherein the particular set has at least two classes, and wherein each class in a given set (a) is defined by stored characteristics for client devices that the at least one content server matches against a given client device to determine membership in the class and (b) is associated with a different version of web content, the at least one content server holding data that specifies, on a URL by URL basis, which set of classes to select based on a given URL;

(iii) selects a particular class from amongst the at least two classes in the particular set, at least in part because the particular client device has characteristics that match the stored characteristics of the particular class;

(iv) obtains the version of the first web content that is associated with the particular class;

(v) serves the obtained version of the first web content to the particular client device, in response to the request for first web content;

(vi) receives a second request for second web content from a second client device, the second web content being identified by a second universal resource locator (URL);

(vii) selects, based at least in part on the second URL, a second set of classes from amongst the plurality of such sets, wherein the second set has a different number of classes than the particular set of classes selected for the particular URL.

10. The apparatus of claim 9, wherein the memory further holds instructions that, when executed by the at least one processor, cause the special purpose machine to: cache, in a local cache, the version of the first web content associated with the particular class of stored characteristics.

11. The apparatus of claim 10, wherein said caching uses a cache key associated with the particular class of stored characteristics.

12. The apparatus of claim 9, wherein
(i) a given characteristic of the particular client device has a property and a value;
(ii) a given stored characteristic in the particular class of stored characteristics has a property associated with any of a value and a range of values,
and the memory further holds instructions that, when executed by the at least one processor, cause the special purpose machine to: determine whether the given characteristic of the particular client device matches the given stored characteristic by: determining whether the value of the given property of the particular client device matches the value, or falls within the range of values, of the given stored property.

13. The apparatus of claim 9, wherein to obtain the version of first web content associated with the particular class of stored characteristics, the apparatus retrieves that version from any of: a cache local to the at least one content server, an origin server, and a content adaptation engine.

14. The apparatus of claim 9, wherein at least one of the plurality of sets is specified in metadata stored by the apparatus.

15. The apparatus of claim 9, wherein at least one of the plurality of sets is specified in a header received from an origin server.

16. The apparatus of claim 9, wherein the particular client device comprises a mobile device.

17. The apparatus of claim 9, wherein the apparatus is a proxy server in a content delivery network (CDN) operated by a CDN service provider.

18. The method of claim 1, wherein obtaining the version of first web content associated with the particular class of stored characteristics comprises: retrieving that version from a cache local to the at least one content server, using a cache key associated with the particular class of stored characteristics.

19. The apparatus of claim 9, wherein to obtain the version of first web content associated with the particular class of stored characteristics, the apparatus retrieves that version from a cache local to the at least one content server, using a cache key associated with the particular class of stored characteristics.

20. The method of claim 1, wherein the data that specifies the set of classes to select based on a given URL is held in any of (i) a metadata control file received at the at least one content server, and (ii) a cache data structure at the at least one content server.

21. The apparatus of claim 9, wherein the data that specifies the set of classes to select based on a given URL is held in any of (i) a metadata control file received at the at least one content server, and (ii) a cache data structure at the at least one content server.

* * * * *